Dec. 29, 1942.   H. ECKERLIN   2,306,869

ETCHED SCREEN AND PROCESS FOR ITS PRODUCTION

Filed Oct. 3, 1941

Inventor

Hermann Eckerlin,

By *[signature]*

Attorney

Patented Dec. 29, 1942

2,306,869

UNITED STATES PATENT OFFICE 2,306,869

ETCHED SCREEN AND PROCESS FOR ITS PRODUCTION

Hermann Eckerlin, Frankfort-on-the-Main, Germany; vested in the Alien Property Custodian Application October 3, 1941, Serial No. 413,531

4 Claims. (Cl. 95—81)

In the offset and typographic printing process the picture-models are photomechanically subdivided, as known, with the aid of an etched half-tone-glass crossline-screen. The ruling of same varies from 50 to 400 lines per inch. This half-tone screen is used in the reproduction camera, being placed at some distance from the intersected photographic plate. The etched lines of such half-tone screen are filled with an opaque pigment, and the ratio of the opaque lines to the transparent interval is 1:1. The screen itself consists of two single ruled glass plates, optically sealed together.

The crossing ruling however may also be executed and etched on one glass plate, the lines then being filled and the screen plate itself being optically sealed with an unruled glass plate.

Both types are known under the technical term "etched half-tone screens."

With regard to the intaglio printing process the picture-models are generally subdivided with the aid of an "etched photogravure crossline-screen." In this photogravure screen the ratio of the transparent crossed lines to the opaque interval is generally 1:3, leaving thus opaque spaces of square or rhomboid shape between the crossed transparent lines. These spaces are deeply etched into the glass plate and then filled with an opaque pigment. Such an etched photogravure screen represents with regard to its transparent parts the revers of an etched half-tone screen.

In the intaglio printing process the picture-models are subdivided with the crossline photogravure screen, of 50 to 400 lines per inch, by a printing process in the pneumatic copy frame. The copying of the photogravure screen and the copying of the photographic positive, containing the picture-models, is executed on sensitized pigment paper, known under the technical term "carbon tissue." After the copying procedures the latter is transferred onto the copper-printing form and there developed and then the printing form etched.

Furthermore, there are "unetched half-tone glass crossline-screen" known in the trade. The ruling of the plates is obtained by engraving single transparent lines with the aid of a ruling machine and diamond point in a layer of lead-acetate forming a mirror on the glass plate. Two such ruled plates are optically sealed together to form a cross-line half-tone screen.

In the intaglio printing process it became evident that in the case of high temperatures which arise in hot summers or in southern countries, the sensitized carbon-tissue inclines easily to get dimmed. On account of a still higher temperature in the copying-room and especially with the additional heat from the radiation of the several copying electric arc-lamps being used for the exposures, the dimness of the sensitized carbon-tissue is increased, as the copying process takes about 30 minutes all in all. It is well known to every skilled worker in the art that heat has nearly the same effect on sensitized photographic paper as a direct short insolation on same. The dimness on sensitized carbon tissue is disadvantageous insofar, as during the developing process of the copied and screened pictures they do not always appear clear and sharp on the printing form for the necessary etching.

To overcome these difficulties the use of special pneumatic copying frames has been proposed which have been provided with a cooling system in order to keep the carbon tissue cool during the time of insolation. Their introduction however has not been successful in the trade.

According to the present invention the inclination to dimness of the sensitized carbon-tissue can be avoided by using an etched photogravure screen in which the deepened etched dots are mirrored with a solution of lead-acetate or with silver nitrate, or the like. When the deepened dots are thus covered with the mirror coating, the usual filling of an opaque pigment is added. The light of the several electric arc-lamps during the time of screen exposure is thus reflected to such an extent that dimness of the nonexposed parts on the sensitized carbon tissue is avoided. The light of the electric-arc lamps and their radiating heat during the first copy of the screen is only able to penetrate the thin transparent crossed lines which form only about 30% of the whole screen surface, whereas for the succeeding separate copies of the photographic positives about 70% of the nonexposed dotted screen surface remain protected from the radiating heat of the arc-lamps.

The new screen and the process for its production are illustrated by the annexed drawing.

Figure 1:
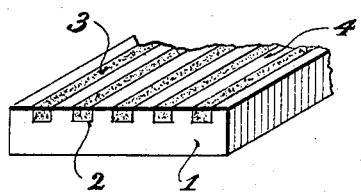
Fig. 1 shows a usual etched half-tone screen.

The known etched half-tone screen consists of two glass plates 1 (one of which being shown in Fig. 1) with etched lines 2, filled with an opaque pigment 3. The two plates are optically sealed together in such a manner that the etched lines will cross one another. The light may thus penetrate only through the transparent spaces 4 surrounded by the opaque lines 2.

The etched photogravure screen (Fig. 2) consists of a glass plate 1 in which dots 6 are etched into the surface so that a system of transparent crossing lines remains standing in relief. The does are filled with an opaque pigment 3.

Figure 3:
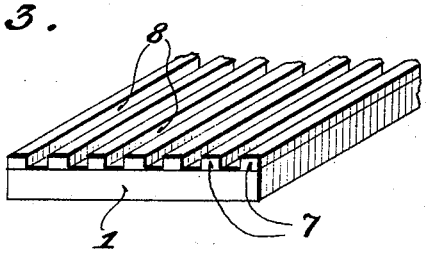
Fig. 3 shows a known unetched half-tone screen having the lines engraved in a coating of lead-acetate on the glass plate.

The unetched half-tone screen (Fig. 3) consists of a glass plate 1 with a mirror foil 7, out of which the transparent screen lines 8 have been engraved.

Figure 2:
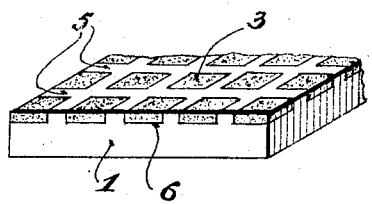
Fig. 2 shows a usual etched photogravure screen.
Figure 6:
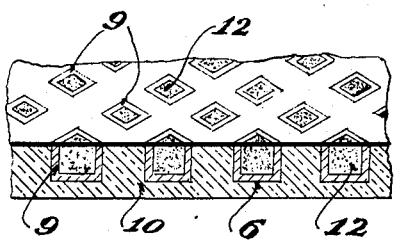

According to the invention the etched screen relating to Fig. 1 or Fig. 2, respectively, underneath the filling 12 in the etched lines 2 or dots 6, resp., is provided with a mirror foil (Fig. 6). The production of the new screen is carried out in the following manner:

The glass plate 10 (Fig. 4) which is provided with etched lines or dots, is covered on its back with a protective lacquer coating 11 and is then immersed into a bath, whereby it is covered with a mirror foil all over its screened surface.

The bath may consist of
1 part of thiourea
50 parts of water
50 parts of diluted solution of lead acetate and
50 parts of a diluted solution of caustic potash,
or of
1 kg. sulphide of silver diluted in
1000 ccm. water and 10 ccm. sulphuric acid,
1000 ccm. ammonia.

Figure 4:
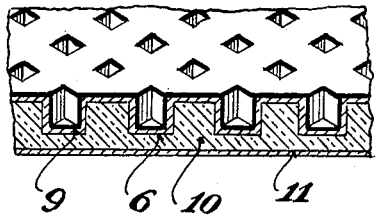
Figs. 4–6 show the production of the new photogravure screen in various stages.
Figure 5:
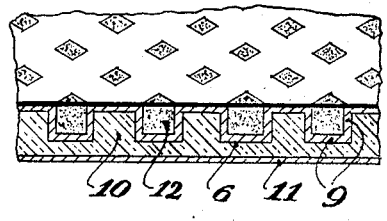

On the surface of the glass plate 10 and in the recesses a mirror foil 9 is formed (Fig. 4). The recesses are then filled with an opaque substance containing pigment (Fig. 5), whereupon in a bath of iron chloride or in a bath of nitric acid and hydrochloric acid the mirror foil covering the crossed lines in relief, which are not coated with the opaque pigment, are dissolved. The lacquer or protective coating 11 on the back of the glass plate is removed. Thus a ruled halftone screen or a dotted photogravure screen is obtained, the deepened etched lines or dots 2 and 6 respect. are provided with a mirror foil 9 underneath the usual opaque pigment 12 (Fig. 6).

The advantage of the etched mirrored halftone screen as described lies in that a repairing, in case of a deterioration in its optical sealing, is possible whereas a repairing of a deteriorated sealing in the unetched mirrored half-tone screen is not possible without deteriorating also the screen structure itself.

Instead of using the foresaid solutions to produce the mirror foil any other chemical metal salt may be used.

Instead of using glass for the screen any other transparent material such as Celluloid, cellon or Cellophane, etc., may be used.

Having now carefully described and ascertained the nature of my said invention and in what manner it is to be performed I declare that what I claim is:

1. Etched half-tone screen, comprising two glass-plates optically sealed together and provided with etched lines at the adjacent sides, a mirror foil on the ground of the etched lines, these lines being filled with an opaque pigment.

2. Etched photogravure glass screen, comprising one glass plate provided with etched dots and crossing transparent lines in relief, a mirror foil covering the surfaces of the etched dots, the dots being filled with an opaque pigment.

3. A method for producing etched screens for photochemical and photomechanical purposes comprising covering a transparent plate which on its front side is provided with etched lines or dots on its back with a protecting coating, covering the front of the plate including the surfaces of the etched lines or dots with an opaque coating of minor like structure, filling the lines or dots with an opaque pigment, applying a solvent to the plate to remove the mirror foil from the places not covered by the opaque pigment and removing the protective coating on the back of the plate.

4. A method for producing etched screens for photochemical and photomechanical purposes comprising covering a transparent plate which on its front side is provided with etched lines or dots, on its back with a protecting coating, covering the front of the plate including the surfaces of the etched lines or dots with a coating of lead acetate, filling the lines or dots with an opaque pigment, applying a lead acetate solvent to the plate to remove the lead acetate coating from the places not covered by the pigment and removing the protective coating on the back of the plate.

HERMANN ECKERLIN.